Jan. 18, 1966 M. J. MENDELSON ET AL 3,230,350

SKEW COMPENSATING SYSTEM

Filed Dec. 5, 1961 2 Sheets-Sheet 1

INVENTORS
MYRON J. MENDELSON
WILLIS E. DOBBINS
BY Henry L. Shenier
ATTORNEY

Jan. 18, 1966 M. J. MENDELSON ET AL 3,230,350

SKEW COMPENSATING SYSTEM

Filed Dec. 5, 1961 2 Sheets-Sheet 2

INVENTOR.
MYRON J. MENDELSON
WILLIS E. DOBBINS
BY
Henry L. Shenier
ATTORNEY

United States Patent Office 3,230,350

Patented Jan. 18, 1966

3,230,350
SKEW COMPENSATING SYSTEM

Myron J. Mendelson, Los Angeles, and Willis E. Dobbins, Manhattan Beach, Calif., assignors, by mesne assignments, to Coleman Engineering Company, Inc., Los Angeles, Calif., a corporation of California Filed Dec. 5, 1961, Ser. No. 157,143
7 Claims. (Cl. 235—61.11)

Our invention relates to a skew compensating system and mort particularly to a system for accurately reading columns of marks placed on a form which passes through the reader in a skewed condition.

There are known in the prior art various form handling systems in which forms such as ballots or the like pass through a reading device having a number of heads corresponding to the number of columns of marks on the form. An appropriate means such, for example, as a pneumatic handler causes the forms to pass under the reading heads. When the system operates properly the marks of a row of respective marks from the various columns simultaneously pass under the reading heads. It often happens owning to windage or for other reasons that the form is moved past the reading heads so oriented that its longitudinal axis is skewed or disposed at an angle with the direction of travel through the reader. When this occurs, all the marks of a row do not pass under the reading heads at the same time and consequently either a mark is not read or a mark from the wrong row is read so that it is not properly identified. When these conditions prevail, the result produced by the system is not an accurate indication of the marks which have been placed on the ballot or the like. This undesirable result is aggravated in high speed form handling systems.

We have invented a system for compensating for skew of a form such as a ballot or the like being passed through a reader. Our system activates the heads associated with the respective columns at the precise times at which corresponding marks of a row comprising marks from the respective columns pass under the heads. Our compensating system permits a reading device to read forms accurately without regard to the fact that the form is skewed in passing through the reading device. We accomplish this result in a rapid, expeditious and simple manner. Our apparatus compensates for skew in either direction.

One object of our invention is to provide a skew sensing system which permits a form passing through a reader to be read accurately without regard to the fact that it is skewed.

Another object of our invention is to provide a system for compensating for skew of a form passing through a reading device.

Still another object of our invention is to provide a system for compensating for skew no matter which edge of the form leads.

A further object of our invention is to provide a skew sensing system which is simple, reliable and which is capable of operating at high speeds.

Other and further objects of our invention will appear from the following description.

In general our invention contemplates the provision of a system for compensating for skew of a form having columns of marks to be read which are separated by columns of information of at least two different widths passing through a reader having sensing heads corresponding to the columns of marks to be read. In our compensating system we accumulate respective counts representing the time sequence of arrival of marking squares or spaces in a common row adjacent their respective sensing heads and provide means responsive to these counts for delaying the activation of a reading head until a corresponding marking space is under the head without regard to the direction in which the form is skewed.

In the accompanying drawings which form part of the instant specification and which are to be read in conjunction therewith and in which like reference numerals are used to indicate like parts in the various views.

Figure 1:
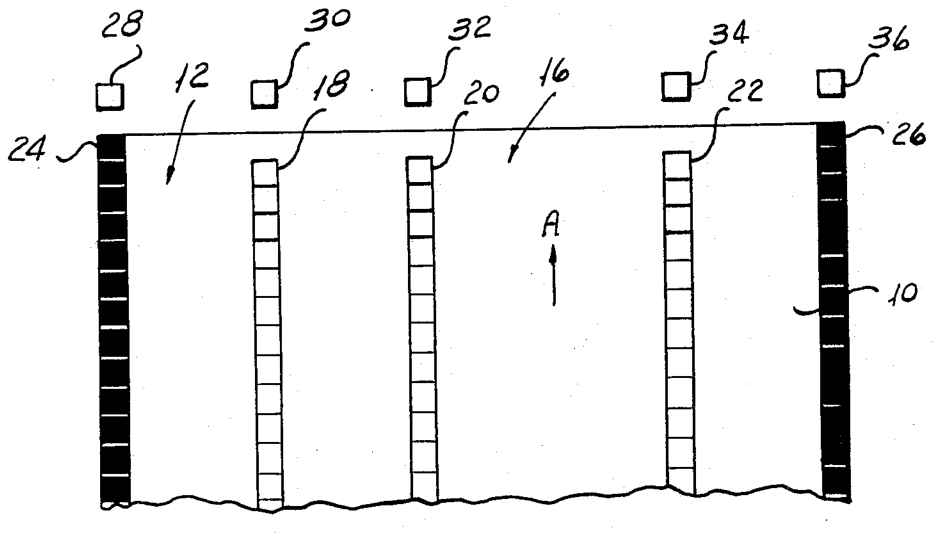
FIGURE 1 is a fragmentary plan view of a form with which our compensating system is used and showing the reading heads associated with the form.

Referring now to FIGURE 1 of the drawings, we have illustrated one form such as a ballot 10 with which our skew compensating system can be used. The ballot 10 may, for example, include a plurality of respective columns, indicated generally by the reference characters 12, 14 and 16, each of which has information such as candidates' names or propositions to be voted on or the like. To the right of each of the columns 12, 14 and 16 is a column of marking spaces or blocks 18, 20 or 22 adapted to be marked in a suitable manner by a voter or the like to indicate a choice of candidate, for example. Adjacent the respective edges of the ballot 10 are respective columns of reference marks 24 and 26. In a system in which our compensating arrangement is employed a ballot handler, the details of which are not shown, causes the ballot 10 to move in the direction of the arrow A in FIGURE 1 under a plurality of reading heads 28, 30, 32, 34 and 36 associated respectively with the columns of marks and blocks 24, 18, 20, 22 and 26. It will readily be seen that the arrangement of the ballot 10 is such that a pair of reference marks 24 and 26 is aligned with a row of spaces 18, 20 and 22. If the ballot 10 is not skewed then the spaces of a row all move under their associated reading heads at the same time and any marks made in the spaces can be assigned to the proper space without error. If, however, the ballot is skewed in the course of its passage under the reading heads then spaces of a row will not be under the corresponding heads at the same time. As is pointed out hereinabove, this fact may result in a misreading of the ballot.

Figure 2:
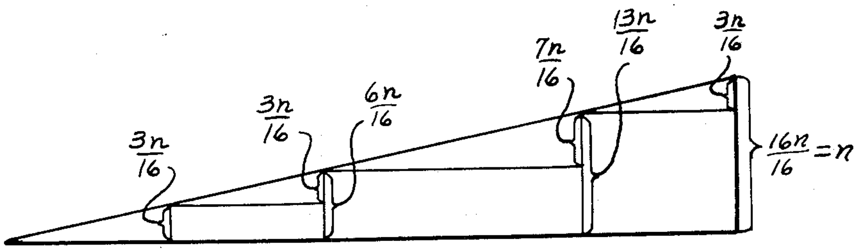
FIGURE 2 is a diagram illustrating the effect of the ballot geometry in determining the count necessary to compensate for skew of a form.

In our system for compensating for skew of the ballot 10, we first generate counts, each of which counts represents the time delay between two points, one on each side of a column, along a line parallel to the line of marking spaces due to the skew of a ballot 10. By way of example, we have shown a ballot 10 including two narrow information columns 12 and 14 of the same width and a wide column 16. We have shown the right hand reference marks in column 26 as being spaced from the column 22 by a space equal to the width of a narrow column. Referring to FIGURE 2 we have illustrated the delays in the passage of respective spaces under the reading heads which result when the ballot is skewed, for example, with the left edge leading. Let us assume that from the time of passage of a mark 24 under its head 28 to the passage of a corresponding mark 26 under its head 36, "$n$" counts have been generated. Assume further that the width of the ballot 10 is 16 units, the width of the columns 12 and 14 is 3 units each and the width of the column 16 is 7 units. Then, as will be apparent from the showing of FIGURE 2, when a mark 24 passes under head 28 then the space 18 in the same row will not pass under the head 30 until $3n/16$ counts have passed. Likewise, the space 20 in the same row will not pass under its head until a count of $6n/16$ from the time of passage of the mark 24 under the head 28. Passage of a space 22 under the head 34 will be delayed until the count of $13n/16$ and the trailing edge mark 26 in the same row will not pass under head 36 until the full count of $n$ counts.

Figure 3:
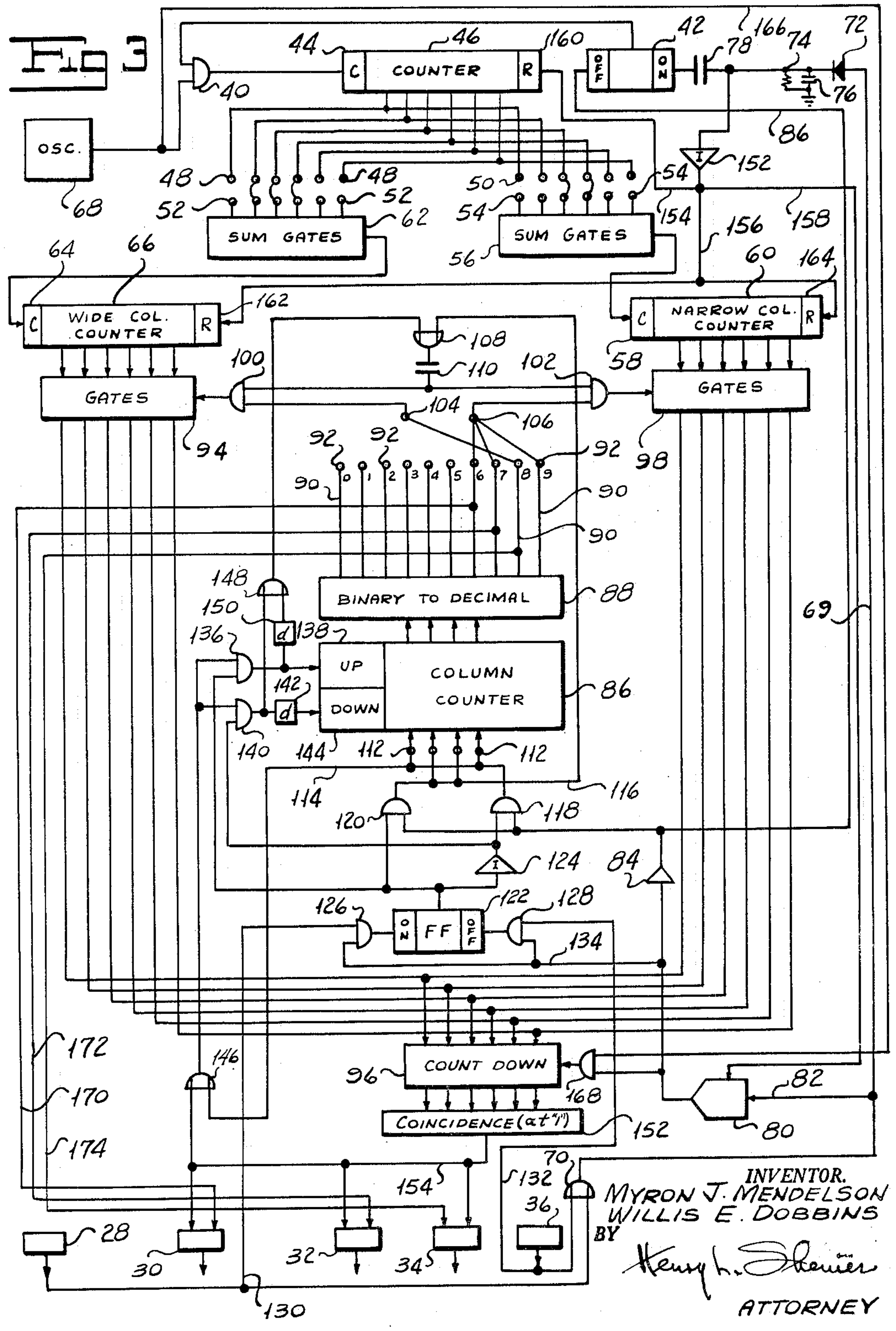
FIGURE 3 is a schematic view of one form of our skew compensating system.

Referring now to FIGURE 3, our means for generating counts proportional to the time delay across the widths of wide and narrow columns includes an oscillator 68 which supplies one input of a two-input AND circuit 40, the other input of which is provided by a flip-flop circuit 42 in a manner to be described hereinafter. With both inputs to the circuit 40 present, pulses from the oscillator are fed to the counting input 44 of a counter 46 of a suitable type known in the art adapted to produce an output count in the natural binary code of the number of pulses applied to the input portion 44 of the counter 46.

Referring again to FIGURE 1, it will be noted that there are no marking spaces 18, 20 and 22 between the first pair of marks 24 and 26. In a manner to be described hereinafter we cause the passage of the leading pulse of the first two pulses 24 and 26 to initiate the action of counter 46 and we cause the trailing one of these two pulses to terminate the count. Thus counter 46 produces a total count which is proportional to the skew of the ballot. We employ a technique which can be termed "sift multiplication" to determine the proportions of the total count corresponding to the delay between a pair of points on either side of each wide and narrow column. We connect the output signals of the counter 46 to respective sets of plugboard contacts 48 and 50 adapted to be connected to sets of contacts 52 and 54. The technique of sift multiplication to obtain a fraction of a total count can readily be demonstrated. First, it will be noted that as the count increases in the natural binary code, one and only one bit position which contained a zero for a preceding count contains a one for the succeeding count. That is, when the count increases by one there is one and only one bit position in which a change from zero to one occurs. If the number of changes from zero to one in the least significant bit place is counted it will readily be apparent that the resultant count is half the original count. Further, if the number of changes from zero to one in the next-to-least significant bit place is counted the resultant count is one-fourth of the original count. In general, if the zero to one changes of the $n$th bit position are counted in a second counter then the content of the second counter will be exactly $(\frac{1}{2})^n$ times the count of the first counter. Further, these changes from zero to one in any set of bit positions can be combined in a single pulse train and counted with a single second counter since such changes never are coincident. As will be clear from the discussion of FIGURE 2 given hereinabove, the number of counts corresponding to the width of a narrow column 12 or 14 is $3n/16$ where $n$ is the total number of counts representing the skew of the form. It will further be clear from the discussion of sift multiplication that if we sum the number of changes zero to one in the third and fourth least significant places of the count from counter 46 we will have a resultant count of $\frac{3}{16}=\frac{1}{8}+\frac{1}{16}$ of the count on counter 46. We connect the terminals 50 corresponding to the third and fourth least significant output places of counter 46 to terminals 54 leading to summing gates 56 which feed the counting input section 58 of a narrow column counter 60 which accumulates a count corresponding to the delay between the time of passage of two points on either side of a narrow column.

We connect the terminals 48 corresponding to the next-to-least, third least and fourth least significant places of the output of counter 46 to terminals 52 which feed summing gates 62, the output of which actuates the count input section 64 of a wide column counter 66 which accumulates a count which corresponds to the delay between the time of passage of two points on either side of a wide column 16.

The marks in the reference columns 24 and 26 may be made by any suitable detectable medium. They may, for example, be made with fluorescent ink or they could be magnetic material or the like. The associated heads 28 and 36 are of any appropriate type adapted to detect the marks. Assuming that the ballot 10 is moving toward the row of reading heads with some skew so that one edge of the ballot leads, one of the two heads 28 or 36 will produce an output signal. We connect the heads 28 and 36 to a conductor 69 through an OR circuit 70. Signals on conductor 69 are fed through a pulse lengthening circuit including a diode 72 and a resistor 74 and capacitor 76 connected in parallel from the crystal output to ground to capacitor 78. In response to the first pulse appearing on conductor 69, capacitor 78 produces an output. This results in the application of a positive pulse through the capacitor 78 to the ON input terminal of flip-flop 42 which in turn opens gate 40 to permit pulses from oscillator 68 to enter counter 46 and cause it to count.

Our system includes a scale-of-two counter 80 which, in a manner to be described hereinafter, is originally set to produce zero output. The first pulse appearing on conductor 69 is applied to counter 80 by a conductor 82 to cause its output to change from the zero state to the one state. An inverter 84 couples the output of counter 80 to a conductor 86 connected to the OFF input terminal of flip-flop 42. Since the first pulse on conductor 69 causes counter 80 to be in the one output condition and since inverter 84 inverts this signal, there is no signal applied to flip-flop 42 to turn this flip-flop off. Still considering the first two marks 24 and 26, when the lagging pulse appears on conductor 69 the ON terminal of flip-flop 42 will not be affected owing to the fact that the pulse lengthening circuit which triggers flip-flop 42 prevents this flip-flop from changing its condition. However, this second pulse on conductor 69 is fed to counter 80 to return its output to the zero state. Under these conditions inverter 84 produces an output which is fed to the OFF input terminal of flip-flop 42 to turn this flip-flop off to remove one of the input signals to AND circuit 40. From the structure just described, it will be apparent that the first pair of pulses 24 and 26 cause counter 46 to count a number of oscillator pulses proportional to the skew of the form and that following this operation the counter 66 carries a count proportional to the delay due to skew across a wide column 16 while counter 60 carries a count which is proportional to the delay due to skew across a narrow column 12 or 14.

Our system is set up so that it can accommodate a ballot having 10 columns numbered zero to nine. In the particular example being considered, columns 12, 14 and 16 correspond respectively to the columns numbered six, seven and eight, while the space between blocks 22 and marks 26 corresponds to the column numbered nine. In setting up our system before its operation takes place we must know the geometry of the ballot which is the number of columns provided and the size of the columns as well as the ballot width. In the particular example shown in FIGURE 1, from left to right the ballot has information columns which are the narrow column 12, the narrow column 14, and the wide column 16 and the dummy narrow column or space between the blocks 22 and the marks 26. Our system includes a column counter 86 which, in a manner to be described hereinafter, is adapted to be preset to any count from zero to nine and is adapted to be actuated to count up or to count down. Counter 86 produces a binary coded output count which is fed through a binary-to-decimal converter 88 which activates one of ten output conductors 90 depending on the particular output of the column counter 86. We connect conductors 90 to a plurality of respective plugboard terminals 92 corresponding to zero and to the digits from one to nine representing the form columns.

A plurality of gates 94 are adapted to be rendered conductive to couple the output of the wide column counter to an interval counter 96. Gates 98 similar to gates 94 are adapted to be rendered conductive to feed the count from the narrow column counter to the interval counter 96. Respective two input AND circuits 100 and 102 produce output signals in response to the presence of input signals at both their input terminals to permit the gates 94 and 98 to pass the appropriate count to the interval counter 96. We connect a respective input terminal of each of the AND circuits 100 and 102 to a plugboard terminal 104 or 106. It will be appreciated that the terminal 104 can be considered a wide column terminal while the terminal 106 is a narrow column terminal. We connect the terminals 92 to which the output of the converter 88 is fed to the terminals 104 and 106 in accordance with the geometry of the ballot. In the particular example being considered, we connect the terminals 6 and 7 corresponding to the narrow columns 12 and 14 as well as the terminal 9 corresponding to the space between the columns 22 and 26 to the terminal 106. The terminal 8 corresponding to column 16 is connected to terminal 104. When the column counter 86 counts, signals are passed to the terminal 104 or 106. The other input to the circuits 100 and 102 is provided by a two input OR circuit 108 through a capacitor 110. Inputs to the OR circuit 108 are derived from the column counter actuating mechanism in a manner to be described hereinafter.

From the structure thus far described it will be clear that where the left edge of the form 10 leads then the count should begin with column 6 and proceed upwardly to the maximum count, nine, provided by the counter. When, on the other hand, the right hand edge of the form 10 leads, the counter should begin with column nine and then count down. In order to accomplish this result, we make provision for setting counter 86 to six when the left edge leads or to nine when the right edge leads. A group of terminals 112 is adapted to receive signals representing any number such, for example, as either six or nine in the binary code to preset the counter. We connect the two outboard terminals 112 to a conductor 114 so that if this conductor carries one then the natural binary representation of nine is fed to counter 88. We connect the two inner terminals 112 to a conductor 116 so that if this conductor carries a signal then the binary representation of six is fed into the counter.

Respective two input AND circuits 118 and 120 are adapted to energize the respective conductors 114 and 116. The output of inverter 84 provides one input to each of the AND circuits 118 and 120. A settable flip-flop 122 provides the other input to circuit 120 in the one condition of the flip-flop. In the zero condition of the flip-flop 122 an inverter 124 provides the other input for AND circuit 118. A two input AND circuit 126 is adapted to apply a signal to flip-flop 122 in response to the presence of signals at both input terminals of the AND circuit 126 to cause a signal representing the ON condition on the flip-flop to appear on the output terminal. A second two input AND circuit 128 is adapted to apply a signal to flip-flop 122 to turn the circuit to the OFF condition in response to the presence of inputs at both terminals of the AND circuit 128.

Conductors 130 and 132 apply the respective outputs of heads 28 and 36 to input terminals of AND circuits 126 and 128. A conductor 134 applies the output of the scale-of-two counter 80 to the other input terminals of the AND circuits 126 and 128. As was explained hereinabove, the first pulse appearing on conductor 82 changes the state of the scale-of-two counter 80 from zero to one while the next pulse returns the counter output to the zero state.

Not only must the proper count be preset into the column counter 86 at the beginning of a cycle of operations but also the counter must be actuated to count up when the left edge of the ballots lead and must be actuated to count down when the right edge of the ballot 10 leads. In response to the presence of inputs at both terminals of a two input AND circuit 136, a signal is applied to the up count section 138 of the counter to cause it to count up. In response to the presence of signals at both input terminals of a two input AND circuits 140 a delay element 142 applies a signal to the down count section 144 of counter 86 to cause the counter to count down. The output of flip-flop 122 provides one input signal for circuit 136 while a two input OR circuit 146 provides the other input signal for circuit 136 as well as one of the input signals for circuit 140. Inverter 124 provides the other input signal for circuit 140. A two input OR circuit 148 receives the output of AND circuit 140 as one input and the output of circuit 136 through a delay element 150 as its other input. Circuit 148 provides one input for the circuit 108, the other input of which comes directly from conductor 116.

We feed the output of the interval counter 96 to a coincidence circuit 152 arranged to provide an output signal when the interval counter reaches one. A conductor 154 applies the output signal of coincidence circuit 152 to one enabling terminal of each of the heads 30, 32 and 34 and to one input of OR circuit 146. Conductor 114 provides the other input for the OR circuit 146.

Owing to the action of the pulse lengthening circuit including resistor 74 and capacitor 76 following the first pulse on a sheet or ballot, the circuit continues to produce an output until the last pulse on the form passes under the associated reading head. When this occurs, the output of the pulse lengthening circuit drops to zero. As a result an inverting amplifier 152 applies a signal to conductors 154, 156 and 158 connected respectively to the reset section 160 of counter 46 to the reset sections 162 and 164 of counters 66 and 60 and to the reset terminal of counter 80. As will be apparent from the explanation given hereinafter, this ensures that our system is set for the next cycle of operation.

A conductor 166 connects the output of oscillator 68 to one input terminal of a two input AND circuit 168 adapted to apply the oscillator pulses to the interval counter 96 to cause the counter to count down. The scale-of-two counter 80 supplies the other input signal for the circuit 168.

The operation of our system for compensating for skew can best be understood by considering a specific example. Let us assume that the form being handled has the geometry illustrated in FIGURE 1 in which there are from left to right a narrow column 12, a narrow column 14, a wide column 16 and a narrow space between blocks 22 and marks 26. Let us assume further that the delay due to skew across each narrow column or space corresponds to $3n/16$ counts and the delay due to skew across the wide column corresponds to $7n/16$ counts as in our previous exposition. Assume further that the total skew of the ballot 10 corresponds to $n=128$ counts. With all the counters of the system set at zero and with the left edge of the ballot leading, when the first mark 24 comes under the head 28 a signal passes through OR circuit 70 to conductor 69. This signal causes a pulse to pass from capacitor 78 to the ON terminal of flip-flop 42 to cause this circuit to provide one input for the AND circuit 40, the other input of which is fed by oscillator 68. Counter 46 now begins to count up and portions of the binary output count of this element pass through the plugboard terminals 48, 50, 52 and 54 which determine fractions of the count which pass through summing gates 62 and 56 to the wide column counter 66 and to the narrow column counter 60.

Now, when the first reference mark of the column 26 passes under head 36 a second pulse appears on conductor 69. It will be remembered that on the occurrence of the first pulse the scale-of-two counter 80 changes its output condition from zero to one owing to the pulse on conductor 82. When the second pulse appears on conductor 69 the output of circuit 80 returns to zero and inverter 84 applies a signal to conductor 86 which turns flip-flop 42 off so that one input to AND circuit 40 disappears and counter 46 stops counting. At this point in the cycle of operation the counter 60 carries a count which is proportional to the delay across the space occupied by a narrow column while counter 66 carries a count corresponding to the delay across the space occupied by a wide column.

With the left edge of the ballot leading, it will be clear that the narrow column delay count must be transferred into the interval counter 96 and when the count of this counter reaches "one" head 30 should be selected. Considering again the first mark of column 24, it will be remembered that the signal produced by this mark turned the scale-of-two counter 80 to the ON condition to apply a signal to one input terminal of each of the AND circuts 126 and 128. At the same time, the signal produced by this mark provides the second input signal to AND circuit 126 to turn flip-flop 122 on to provide one input for the circuit 120. Now, when the first mark from the column 26 produces its pulse after the ballot width count has been made the output of circuit 80 returns to the OFF state and inverter 84 provides the second input for the AND circuit 120. This causes counter 86 to be preset to the count of six to cause converter 88 to energize the terminal 92 corresponding to six to provide one input for AND circuit 102. At the same time conductor 116 feeds an input to OR circuit 108 to provide the second input for AND circuit 102 to permit the gates 98 to pass the narrow column count to the interval counter 96. Now, when the second mark in column 24 passes under head 28 to produce a pulse on conductor 68 the circuit 80 returns to its ON state to permit the oscillator output to pass through AND circuit 168 to cause counter 96 to count down. When this counter counts down from the narrow column count of $3n/16=24$ to 1, then circuit 152 produces an output signal which is applied by conductor 154 to one enabling terminal of head 30 which receives a second signal from the energized terminal 92 corresponding to six through a conductor 170.

It will be appreciated that at this instant the first space or block in column 18 is under head 30 so that any mark made therein can be read. OR circuit 146 applies the signal on conductor 154 to one input terminal of each of the AND circuits 136 and 140. Since flip-flop 122 is now in the ON state an input signal is applied to the other terminal of AND circuit 136 to actuate counter 86 to count up one to cause the terminal 92 corresponding to seven to be energized to provide one input for circuit 102. After a short delay provided by element 150 OR circuit 148 supplies an input to OR circuit 108 to provide a second input to AND circuit 102 to cause gates 98 again to pass the narrow column delay count to the interval counter 96. This circuit counts down as before and, when it reaches the count of one, head 32, which receives one enabling signal from conductor 154 and a second enabling signal from the terminal 92 corresponding to seven through a conductor 172, can read the first block of column 20 which at this time is under head 32.

As before, counter 86 is actuated to count up one count and the terminal 92 corresponding to eight is energized to provide one input signal for the AND circuit 100. After a short interval AND circuit 100 receives a second input to enable gates 94 to pass the wide column delay count to counter 96. When the counter 96 again counts down to one, head 34 is enabled.

Next, the narrow column delay count is again transferred to the interval counter 96 which counts down to one, though this countdown is not in this example, needed to enable a reading head. When the second mark in column 26 passes under the head 36, conductor 82 receives a signal which causes the scale-of-two counter to return to its zero state, which again sets counter 86 to the count of six, and the operation proceeds as before.

It is to be understood that owing to the action of the pulse lengthening circuit including resistor 74 and capacitor 76 this circuit remains in the ON state for as long as the ballot is passing under the reading heads. After the last reference mark has been read, the signal from the pulse lengthening circuit disappears and the inverter 152 applies a signal to the reset conductors 154, 156 and 158 to cause all the counting elements of the device to be reset.

Let us now consider the operation of our system for the same ballot in the case where the right edge of the ballot leads. Under these conditions as before the first pulse produced by the passage of a mark from column 26 under head 36 turns flip-flop 42 to the ON state to cause counter 46 to begin its count. It will be noted that the application of the output of circuit 80 together with the pulse applied directly from head 36 through conductor 132 to the AND circuit 128 does not affect the condition of flip-flop 122. However, since the output of flip-flop 122 is in the OFF state, one input signal is applied by inverter 124 to AND circuit 118 and also to AND circuit 140. Counter 46 continues its count until the first left hand reference mark in column 24 is read by head 28. This action returns counter 80 to its OFF state so that inverter 84 produces an output signal which turns flip-flop 42 to its OFF state to stop counter 46. At the same time it provides a second input for AND circuit 118 to cause counter 86 to be preset to nine to energize the terminal 92 corresponding to nine to provide one input for the AND circuit 102. At the same time conductor 114 provides an input for OR circuit 146 which provides inputs for both AND circuits 136 and 140. Inverter 124 supplies a second input for circuit 140 to feed a second input to circuit 102 through OR circuits 148 and 108 and capacitor 110 immediately to shift a narrow column delay count to the interval counter 96. After a short delay provided by element 142 the counter counts down one. It will thus be seen that with this direction of skew, though we are counting a number of counts proportional to the delay across the width of the space between blocks 22 and marks 26, we have selected head 34. When the counter 96 reaches one, head 34 is enabled by a signal on conductor 154 and by the signal on conductor 174. At the same time conductor 154 supplies a signal through circuit 146 to circuit 140 to cause the wide column delay count to be shifted to the interval counter 96 and then after a short delay to cause counter 86 to count down by one count and enable terminal 92, corresponding to column seven. The operation continues in this manner until all the blocks have been read and the mark 24 has passed under its head 28. After the ballot has passed through the reader the system is reset.

It will be seen that we have accomplished the objects of our invention. We have provided a skew sensing system which permits a form passing through a reading device to have marks thereon assigned to the proper marking spaces without regard to the fact that it is skewed. Our system compensates for the skew of a moving skewed form passing through a form reading system. Our system operates satisfactorily no matter which edge of the form leads. Our system is simple and reliable. It is capable of operating at high speeds so that it is adapted to be used in connection with high speed form reading systems.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A system for compensating for skew of a form moving along a path and having a leading edge and a trailing edge and an intermediate marking space in which mark may be placed including in combiation, a sensor adapted to be activated to sense the presence of a mark in said marking space as it passes thereby, means mounting said sensor at a fixed position adjacent said path and means responsive to skew of a moving form for delaying the activation of said sensor until said space is in a position to be sensed.

2. A system for compensating for skew of a form moving along a path and having a certain width between a trailing edge and a leading edge, said form having a marking space between said leading edge and said trailing edge, including in combination, means adapted to sense the presence of a mark in said marking space as it passes thereby, means mounting said sensor at a fixed position adjacent said path, means for rendering said sensing means operative and means responsive to movement of a skewed form relative thereto for delaying the action of said last-named means until said marking space registers with said sensing means.

3. A system for compensating for skew of a form moving along a path and having a pair of reference marks adjacent its respective edges and having intermediate columns of marking spaces corresponding respectively to wide and narrow information columns including in combination, a plurality of sensing devices each adapted to be rendered operative to produce an output signal in response to the passage of a mark thereby, means mounting said scanning devices in spaced relationship to each other in fixed positions adjacent said path at which they can be read said marking spaces, means for rendering said scanning devices operative and means responsive to the sequential passage of said reference marks thereby for delaying the operation of said last-named means until respective marking spaces register with the corresponding sensing devices.

4. A system for compensating for skew of a form having a leading edge and a trailing edge, said form having a wide information column and a narrow information column and respective columns of spaces adjacent said information for receiving marks including in combination, respective sensing devices adapted to be activated to read marks in spaces positioned adjacent said devices, means mounting said sensing devices in spaced relationship with a spacing substantially equal to the space between said marking space columns, means responsive to the passage of a form thereby for producing a number of counts proportional to the time delay due to skew across a wide column of a skewed moving form in a direction substantially perpendicular to the direction of movement of the form, means responsive to the passage of a form thereby for producing a number of counts proportional to the time delay due to skew across a narrow column of a skewed moving form in a direction perpendicular to the direction of movement of the form, means responsive to the first delay count producing means for controlling the activation of one of said sensing devices and means responsive to the second delay count producing means for controlling the activation of the other sensing device.

5. A system for compensating for skew of a form having a leading edge and a trailing edge, said form having a wide information column and a narrow information column and respective columns of spaces adjacent said information columns for receiving marks including in combination respective sensing devices adapted to be activiated to read marks in spaces positioned adjacent said devices, means mounting said sensing devices in spaced relationship with a spacing substantially equal to the space between said marking space columns, means responsive to the passage of a form thereby for producing a number of counts proportional to the extent of a skewed moving form in a direction substantially perpendicular to the direction of movement of the form, means comprising a first sift multiplier responsive to said count producing means for generating a count proportional to the extent in said substantially perpendicular direction of a wide column of the skewed moving form, means comprising a second sift multiplier for generating a count proportional to the extent in said substantially perpendicular direction of a narrow column of the skewed moving form, means responsive to said wide column count generating means for controlling the activation of one of said sensing devices and means responsive to the narrow column count generating means for controlling the activation of the other sensing device.

6. A system for compensating for skew of a form having a leading edge and a trailing edge, said form having a wide information column and a narrow information column and respective columns of spaces adjacent said information columns for receiving marks including in combination respective sensing devices adapted to be activated to read marks in spaces positioned adjacent said devices, means mounting said sensing devices in spaced relationship with a spacing substantially equal to the space between said marking space columns, means responsive to the passage of a form thereby for producing a number of counts proportional to the time delay due to skew across a wide column of a skewed moving form in a direction substantially perpendicular to the direction of movement of the form, means responsive to the passage of a form thereby for producing a number of counts proportional to the extent in said substantially perpendicular direction of time delay due to skew across a narrow column of a skewed moving form, means comprising a coincidence counter for activating said sensing devices, means adapted to be actuated to pass said narrow column delay count to said coincidence counter, means adapted to be actuated to pass said wide column delay count to said coincidence counter, and means responsive to the leading edge of said form for activating said count passing means in an order corresponding to the order of passage of said marking space columns adjacent their sensing devices.

7. A system for compensating for skew of a form having a leading edge and a trailing edge, said form having a wide information column and a narrow information column and respective columns of spaces adjacent said information columns for receiving marks including in combination respective sensing devices adapted to be activated to read marks in spaces positioned adjacent said devices, means mounting said sensing devices in spaced relationship with a spacing substantially equal to the space between said marking space columns, means responsive to the passage of a form thereby for producing a number of counts proportional to the time delay due to skew across a wide column of a skewed moving form in a direction substantially perpendicular to the direction of movement of the form, means responsive to the passage of a form thereby for producing a number of counts proportional to the time delay due to skew across a narrow column of a skewed moving form in a direction substantially perpendicular to the direction of movement of the form, a column counter, means responsive to the leading edge of said form for setting said column counter to a predetermined count, means responsive to said leading edge for determining the direction in which said column counter counts, a coincidence counter, means responsive to said column counter for passing said narrow column delay count and said wide column delay count to said coincidence counter in a sequence corresponding to the sequence of wide and narrow columns in a direction from the leading edge to the trailing edge of said form, means responsive to said coincidence counter for actuating said column counter and means responsive to said coincidence counter for activating said sensing devices.

References Cited by the Examiner

UNITED STATES PATENTS 2,928,953 3/1960 Bassler ------------ 250—219.1

MALCOLM A. MORRISON, *Primary Examiner.*

DARYL W. COOK, *Examiner.*